No. 820,112. PATENTED MAY 8, 1906.
M. W. HEYENGA.
VEHICLE AXLE.
APPLICATION FILED JULY 15, 1905.

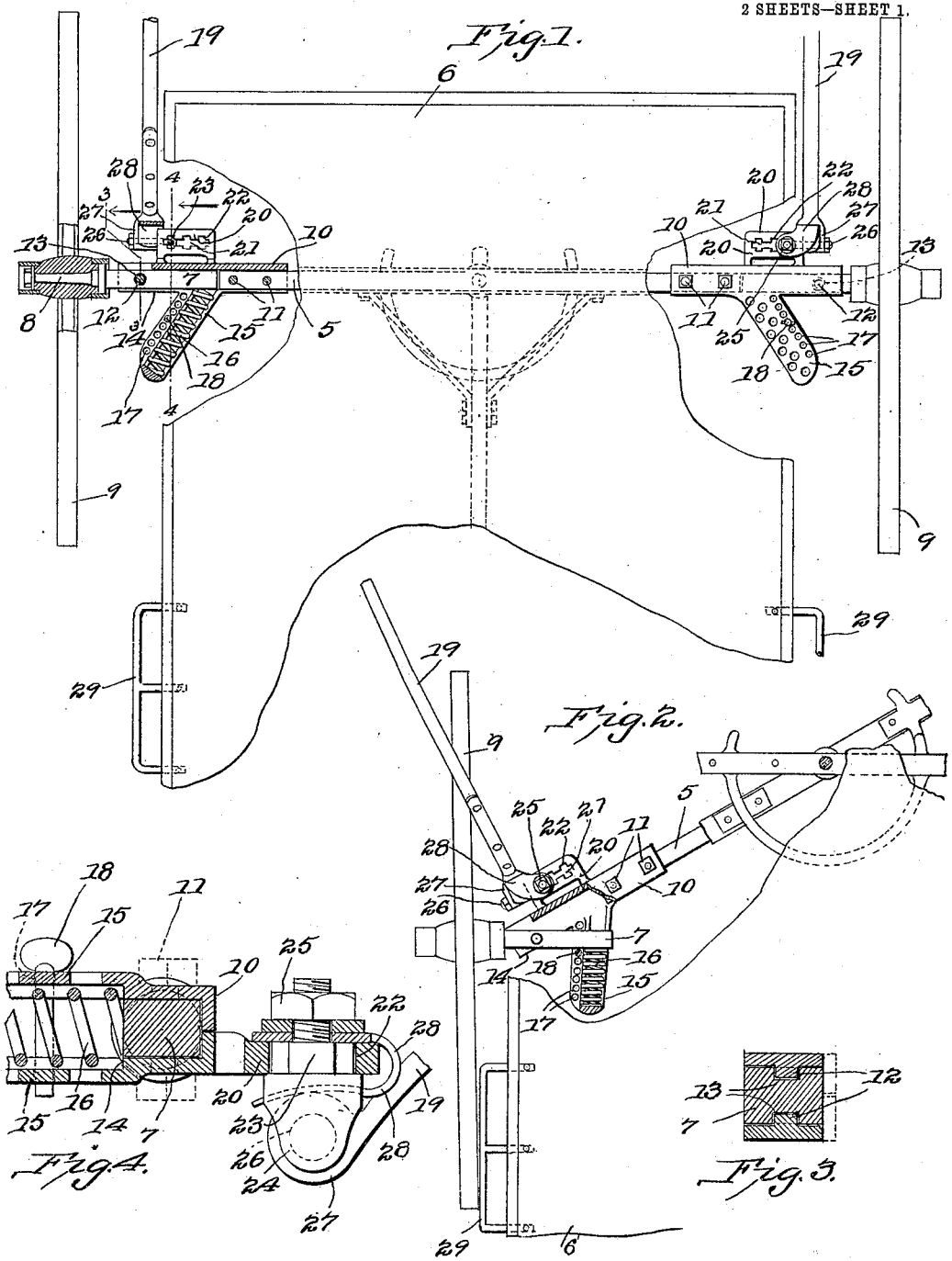

2 SHEETS—SHEET 2.

Witnesses

Martin W. Heyenga,
Inventor,
by C. A. Snow & Co.
Attorneys

UNITED STATES PATENT OFFICE.

MARTIN W. HEYENGA, OF HARTSBURG, ILLINOIS.

VEHICLE-AXLE.

No. 820,112.　　　　　Specification of Letters Patent.　　　　　Patented May 8, 1906.

Application filed July 15, 1905. Serial No. 269,847.

*To all whom it may concern:*

Be it known that I, MARTIN W. HEYENGA, a citizen of the United States, residing at Hartsburg, in the county of Logan and State of Illinois, have invented a new and useful Vehicle-Axle, of which the following is a specification.

This invention relates to an improved axle for carriages, buggies, and other vehicles, and has for its object to provide means whereby the spindle of the axle will yield laterally, so as to prevent the wheels of the buggy from passing beneath the body of the vehicle and upsetting the latter when making short turns or in traveling around sharp curves.

A further object of the invention is to provide an axle the spindles of which are pivotally mounted for independent lateral movement and normally maintained in alinement with the axle by means of coil-springs, which also serve to receive the jar or impact of the wheels when the vehicle strikes a rock or other obstruction in the road.

A still further object of the invention is to provide means for limiting the lateral movement of the spindles and novel means for attaching the thills to the axle.

With these and other objects in view the invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the principle or sacrificing any of the advantages of this invention.

Figure 5:
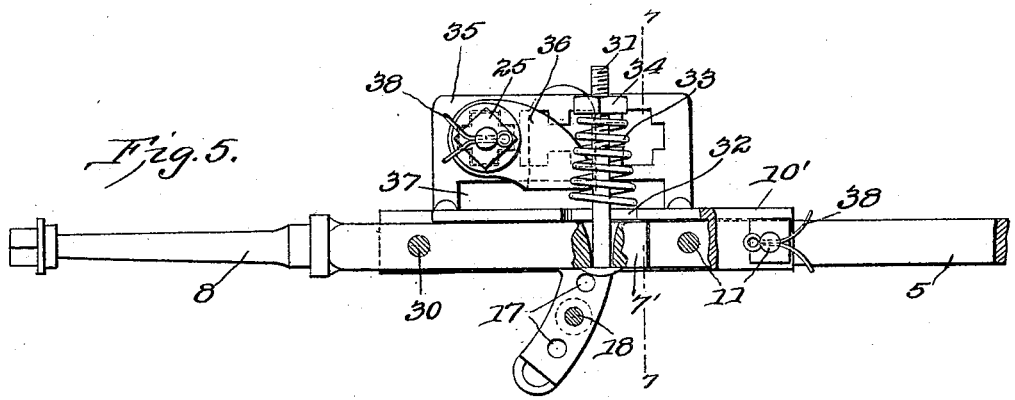
Figure 6:
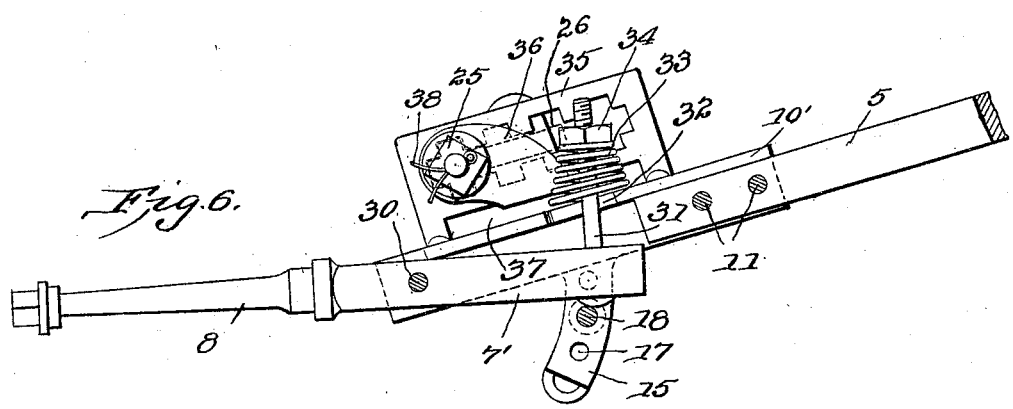
Figure 7:
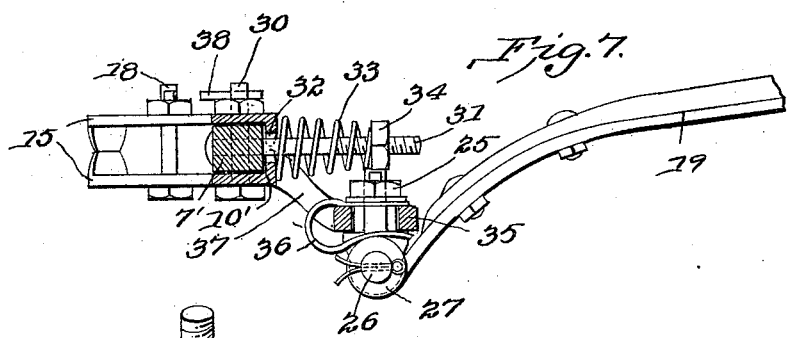
Figure 8:
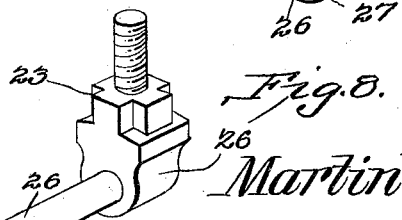

In the accompanying drawings, forming a part of this specification, Figure 1 is a top plan view of the forward portion of a vehicle, showing an axle constructed in accordance with my invention in position applied thereto. Fig. 2 is a similar view showing the position of one of the spindles when making a short turn. Fig. 3 is a transverse section taken on the line 3 3 of Fig. 1. Fig. 4 is a transverse section taken on the line 4 4 of Fig. 1. Fig. 5 is a top plan view, partly in section, of a modified form of the invention. Fig. 6 is a similar view showing the position of the spindle illustrated in Fig. 5 when the vehicle is making a short turn. Fig. 7 is a transverse section taken on the line 7 7 of Fig. 5, a portion of the thill being shown in position to better illustrate the device. Fig. 8 is a detail perspective view of the thill-block shown in Figs. 1, 4, and 7.

Similar numerals of reference indicate corresponding parts in all the figures of the drawings.

The improved axle 5, which may be used in connection with a buggy or other vehicle, is shown, by way of illustration, attached to a wagon-body 6. The axle is preferably formed in three sections, the intermediate portion of which is of the usual construction and the stub-axles 7 provided with terminal spindles 8, upon which are mounted for rotation the wagon-wheels 9. The opposite ends of the intermediate section of the axle are seated in squared sleeves or coupling members 10, said members being preferably cast or otherwise formed in sections, as shown, and secured together by bolts or similar fastening devices 11, which also retain the central portion of the axle within said sleeves. The coupling members or sleeves are provided with inwardly-extending lugs or trunnions 12, which engage corresponding sockets or recesses 13, provided in the stub-axles 7, whereby said stub-axles are free to swing laterally for the purpose hereinafter referred to, said sleeves being also provided with longitudinal openings 14 to permit lateral movement of said stub-axles. The upper and lower sections of the coupling members or sleeves are formed with laterally-extending perforated arms 15, preferably arranged at an incline to the longitudinal plane of the sleeves and which form casings or housings for the reception of coil-springs 16, the latter being interposed between the ends of the casing and the inner or free ends of the stub-axles 7, thereby yieldably supporting said stub-axles within the coupling members and maintaining the same normally in alinement with the central section of the axle. The arms 15 are provided with a plurality of alined openings 17 for the reception of a stop-pin 18, which by engagement with the stub-axles serves to limit the lateral movement of the spindles.

As a means for supporting the thills 19 I form the lower section of each coupling member or sleeve with a laterally-extending plate or bracket 20, having a longitudinal opening 21 formed thereon, the walls of said opening being notched or recessed, as indicated at 22, for the reception of the correspondingly-shaped lugs 23 of a thill-block 24. By having the thill-blocks formed in this manner the same may be adjusted longitudinally with respect to the plates or brackets 20 to vary the distances between the thills, said blocks being locked in adjusted position by a nut or pin 25. The thill-blocks are provided with spindles 26, adapted to engage the terminal sockets 27 of the thills, while interposed between the nuts 25 and the brackets 20 are spring-clips 28, the ends of which bear against the terminal sockets of the thills, and thereby prevent rattling of the same.

As a means for preventing the wheels 9 from scraping against the sides of the vehicle when making short turns suitable depending guard-rails 29 are secured to the bed of the vehicle on each side thereof and preferably slightly in the rear of the wheels 9, said rails being adapted to receive the impact of the wheels, and thereby prevent any injury to the vehicle-body. It will thus be seen that when the vehicle is making a short turn or traveling around a sharp curve one of the wheels of the front axle will travel in the arc of a circle, while the opposite wheel being forced against the adjacent guard-rail will move the stub-axle laterally against the tension of the spring as clearly shown in Fig. 2 of the drawings, thereby preventing said wheel from passing under the wagon-bed and upsetting the vehicle.

In Figs. 5 to 8, inclusive, there is illustrated a modified form of the invention, in which a bolt 30 serves as the pivotal point for the stub-axle 7' instead of the trunnions shown in Fig. 3. In the case a bolt 31 is loosely mounted in the free end of the stub-axle with its threaded end passing through a slot 32 in the coupling member 10', the coil-spring 33 being mounted on the bolt and interposed between the nut 34 and said coupling member and serving the same function as the spring 16—namely, to yieldably support the pivoted spindle in alinement with the central portion of the axle. The thill-supporting bracket or plate 35 is also preferably offset with respect to the coupling member 10' to accommodate the spring 33 and bolt 31, while the spring-clip or antirattler 36 passes through a slot 37 in the rear of the bracket 35 for engagement with the socket of the thills instead of over the front of the bracket, as shown in Figs. 1 and 4. In this form of the device cotter-pins 38 are inserted in the ends of the several bolts in order to prevent accidental displacement of the nuts.

From the foregoing description it will be seen that there is provided an inexpensive and efficient axle capable of being manufactured at a small cost and admirably adapted for the attainments of the ends in view.

Having thus described the invention, what is claimed is—

1. An axle for vehicles having laterally-movable spindles, means for yieldably supporting the spindles in alinement with the axle, and means for adjusting the extent of lateral movement of said spindles.

2. An axle for vehicles provided with independently-pivoted spindles movable laterally in the direction of the length of the vehicle, means for yieldably supporting said spindle in alinement with the axle, and means for adjusting the extent of lateral movement of the spindles.

3. An axle for vehicles comprising a body portion provided with laterally-movable stub-axles, detachable coupling members connecting the stub-axles to the body portion and means interposed between the walls of the coupling members and the pivoted ends of the stub-axles for yieldably supporting said stub-axles in alinement with the body portion.

4. An axle for vehicles comprising a body portion provided with pivoted stub-axles movable laterally in the direction of the length of the vehicle, detachable coupling members connecting the stub-axles to the body portion and springs interposed between the coupling members and bearing against the stub-axles for maintaining the latter in alinement with the body of the axle.

5. An axle for vehicles comprising a body portion provided with laterally-movable stub-axles, coupling members for connecting the stub-axles to the body portion, means for yieldably supporting said stub-axles in alinement with the body portion, and means carried by the coupling members for adjusting the extent of lateral movement of the stub-axles.

6. An axle for vehicles comprising a body portion provided with laterally-movable stub-axles, coupling members connecting the stub-axles to the body portion and provided with perforated housings, springs seated in said housings and bearing against the stub-axles and pins engaging the perforations in the housing for limiting the lateral movement of said stub-axles.

7. An axle for vehicles comprising a body portion provided with opposite-disposed coupling members, stub-axles pivoted to the coupling members and movable laterally in the direction of the length of the vehicle, springs carried by the coupling members and adapted to bear against the stub-axles, and thill-supporting brackets extending from said coupling members.

8. An axle for vehicles comprising a body portion provided with oppositely-disposed coupling members, stub-axles pivoted to the coupling members and capable of independent lateral movement in the direction of the length of the vehicle, springs carried by the coupling members and adapted to bear against the stub-axles, and means for adjusting the extent of lateral movement of said stub-axles.

9. An axle for vehicles comprising a body portion provided with oppositely-disposed coupling members, laterally-movable stub-axles pivoted to said coupling members, springs adapted to bear against the stub-axles for maintaining the same in alinement with the body portion, thill-supporting brackets extending laterally from the coupling members, and the blocks adjustable longitudinally in said brackets.

10. An axle for vehicles comprising a body portion provided with oppositely-disposed coupling members laterally-movable stub-axles pivoted to said coupling members, springs adapted to bear against the stub-axles for yieldably supporting the latter in alinement with the body portion, thill-supporting brackets secured to the coupling members and provided with longitudinal slots having lateral recesses communicating therewith, and thill-blocks adjustable longitudinally in said brackets and provided with laterally-extending lugs adapted to engage the lateral recesses in the supporting-brackets.

11. An axle for vehicles comprising a body portion provided with laterally-movable stub-axles, coupling members connecting the stub-axles to the body portion and provided with laterally-extending thill-supporting brackets, said brackets being provided with longitudinal slots having spaced laterally-extending recesses communicating therewith adjustable thill-blocks provided with lateral lugs adapted to engage the recesses in the brackets and having a threaded extension passing through the longitudinal slots in said brackets, nuts engaging the threaded extensions for clamping the blocks in adjusted position, and flat springs interposed between said nuts and brackets and having their free ends bent downwardly for engagement with the thills.

In tesimony that I claim the foregoing as my own I have hereto affixed my signature in the presence of two witnesses.

MARTIN W. HEYENGA.

Witnesses:
FRED W. LONGAN,
JOSEPH A. TABKE.